US012203890B2

(12) United States Patent
Chang et al.

(10) Patent No.: US 12,203,890 B2
(45) Date of Patent: Jan. 21, 2025

(54) ACOUSTIC RESONANCE DIAGNOSTIC METHOD FOR DETECTING STRUCTURAL DEGRADATION AND SYSTEM APPLYING THE SAME

(71) Applicant: INDUSTRIAL TECHNOLOGY RESEARCH INSTITUTE, Hsinchu (TW)

(72) Inventors: Hung-Chih Chang, Hsinchu (TW); Yao-Long Tsai, Kaohsiung (TW); Li-Hua Wang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 242 days.

(21) Appl. No.: 17/830,859

(22) Filed: Jun. 2, 2022

(65) Prior Publication Data

US 2022/0291175 A1 Sep. 15, 2022

Related U.S. Application Data

(63) Continuation-in-part of application No. 17/405,423, filed on Aug. 18, 2021.
(Continued)

(30) Foreign Application Priority Data

Jun. 8, 2021 (TW) ................................ 110120800

(51) Int. Cl.
*G01N 29/12* (2006.01)
*G01N 29/14* (2006.01)
(Continued)

(52) U.S. Cl.
CPC ............. *G01N 29/12* (2013.01); *G01N 29/14* (2013.01); *G01N 29/348* (2013.01); *G06N 3/04* (2013.01);
(Continued)

(58) Field of Classification Search
CPC .......... G01M 3/00; G01M 3/24; G01N 29/00; G01N 29/04; G01N 29/12; G01N 29/14;
(Continued)

(56) References Cited

U.S. PATENT DOCUMENTS 6,404,343 B1 6/2002 Andou et al.
8,296,083 B2 10/2012 Martin
(Continued)

FOREIGN PATENT DOCUMENTS

CN 101008992 A 8/2007
CN 101260978 A 9/2008
(Continued)

OTHER PUBLICATIONS

Machine Translation of CN-111325095-A (Year: 2020).*
(Continued)

*Primary Examiner* — Nguyen Q. Ha
(74) *Attorney, Agent, or Firm* — Birch, Stewart, Kolasch & Birch, LLP

(57) ABSTRACT

An acoustic resonance diagnostic method for detecting structural degradation is provided. The method includes steps as follows: Firstly, a training model is built using a deep neural network. At least two training acoustic signals are inputted to the training model to carry a training. A diagnostic model is built according to a result of the training using a CNN. A plurality of under-test sound wave signals are captured from an under-test section of an under-test structure. An AI is used to filter data invalid for detecting structural degradation from the under-test sound wave sig-
(Continued)

nals. A structural degradation state of the under-test section is determined according to a remaining portion of the under-test sound wave signals through the diagnostic model.

15 Claims, 13 Drawing Sheets

Related U.S. Application Data

(60) Provisional application No. 63/071,382, filed on Aug. 28, 2020.

(51) Int. Cl.
*G01N 29/24* (2006.01)
*G01N 29/34* (2006.01)
*G06N 3/04* (2023.01)
*G06N 3/08* (2023.01)
*G06N 20/10* (2019.01)

(52) U.S. Cl.
CPC ............... *G06N 3/08* (2013.01); *G06N 20/10* (2019.01); *G01N 2291/0289* (2013.01)

(58) Field of Classification Search
CPC ......... G01N 29/348; G01N 2291/0289; G06N 3/04; G06N 3/08; G06N 20/10
See application file for complete search history.

(56) References Cited

U.S. PATENT DOCUMENTS

| | | | |
|---|---|---|---|
| 8,665,101 B2 | 3/2014 | Solomon | |
| 2008/0314123 A1 | 12/2008 | Kaji et al. | |
| 2013/0298664 A1 | 11/2013 | Gillette, II | |
| 2015/0185186 A1 | 7/2015 | Han et al. | |
| 2015/0276545 A1 | 10/2015 | Takahashi et al. | |
| 2018/0292292 A1 | 10/2018 | Takahashi et al. | |
| 2019/0017911 A1 | 1/2019 | Kiranyaz et al. | |
| 2022/0065728 A1* | 3/2022 | Chang | G06N 3/045 |
| 2022/0205956 A1 | 6/2022 | Stephens et al. | |

FOREIGN PATENT DOCUMENTS

| | | | | |
|---|---|---|---|---|
| CN | 107802364 A | | 3/2018 | |
| CN | 109045452 A | | 12/2018 | |
| CN | 109242049 B | | 7/2019 | |
| CN | 110333088 A | | 10/2019 | |
| CN | 110755025 A | | 2/2020 | |
| CN | 111325095 A | * | 6/2020 | ............. G01H 17/00 |
| CN | 110185939 B | | 4/2021 | |
| JP | 2020-128951 A | | 8/2020 | |
| KR | 20210074923 A | * | 6/2021 | .......... G01M 5/0066 |
| TW | I649543 B | | 2/2019 | |
| TW | 202043954 A | | 12/2020 | |
| WO | WO 2020/215116 A1 | | 10/2020 | |

OTHER PUBLICATIONS

Machine Translation of KR-20210074923-A (Year: 2021).*
Taiwanese Office Action and Search Report for Taiwanese Application No. 110120800, dated Apr. 8, 2022.
Hendricks et al., "High-Speed Acoustic Impact-Echo Sounding of Concrete Bridge Decks," Journal of Nondestructive Evaluation, vol. 39, No. 58, Jul. 13, 2020, pp. 1-12, abstract provided only.
Schabowicz, "Non-Destructive Testing of Materials in Civil Engineering," Materials, vol. 12, 3237, 2019, pp. 1-13.
U.S. Office Action for U.S. Appl. No. 17/405,423, dated Nov. 4, 2024.
Zhao, "Basics of Structural Vibration Testing and Analysis, Application Note 006," Crystal Instruments, Jul. 2017, pp. 1-18.

* cited by examiner

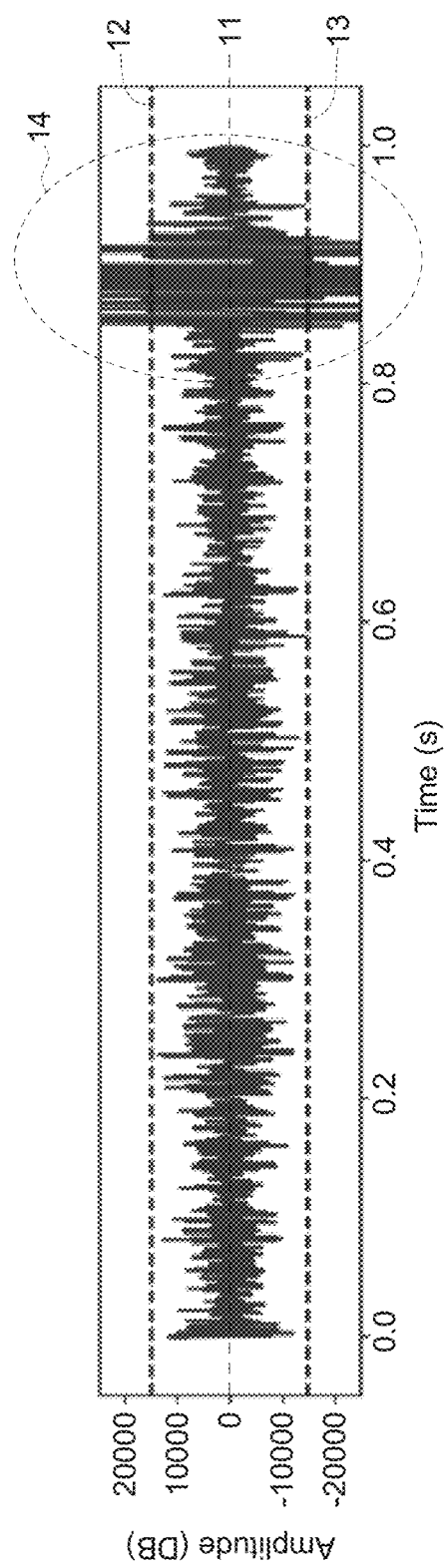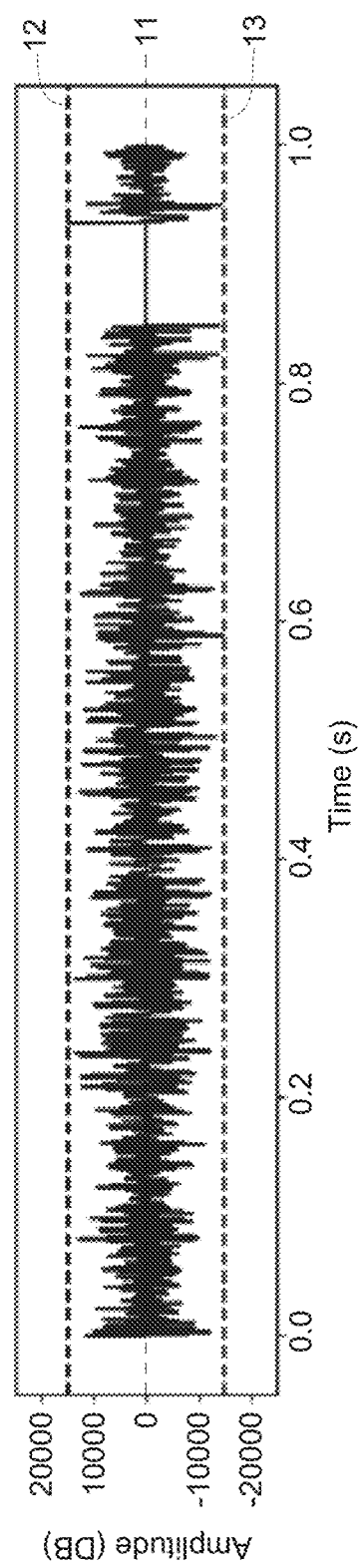

ACOUSTIC RESONANCE DIAGNOSTIC METHOD FOR DETECTING STRUCTURAL DEGRADATION AND SYSTEM APPLYING THE SAME

This application is a continuation-in-part application (CIP) of U.S. application Ser. No. 17/405,423, filed Aug. 18, 2021, which claims the benefit of U.S. provisional application Ser. No. 63/071,382, filed Aug. 28, 2020, and Taiwan Application No. 110120800, filed Jun. 8, 2021, the subject matters of which are incorporated herein by reference.

TECHNICAL FIELD

The disclosure relates in general to a method for detecting structural degradation and system, and more particularly to a method for detecting structural degradation using acoustic resonance diagnostic technology and a system applying the same.

BACKGROUND

Over the years, there have been several accidents related to industrial structures or pipelines. When the industrial structures or pipelines degenerate or leak due to abnormality, severe disasters will occur and end up with casualties and property loss. The abnormality of industrial structures or pipelines are caused mainly by human factors and secondly by the degeneration of the material of industrial structures, pipes or equipment. To avoid the occurrence of disasters, it is essential to monitor the degeneration or leakage of industrial structures or pipelines.

Although the industries have developed several systems and technologies for monitoring industrial structures or pipelines, there still exist many accompanying problems to be resolved. For example, the safety diagnostic module lacks suitable logic judgement, and therefore needs to be evaluated by professionals; the current technology can only suitable for inspection and monitoring of the local degeneration at which the sensor is located and cannot sense the degeneration at a remote end; the current technology cannot emit a warning signal before degeneration occurs; the current technology relies on the inspectors walking to the site to listen to the acoustic change of the pipe.

Therefore, it has become a prominent task for the industries to provide an advanced acoustic resonance diagnostic method for detecting structural degradation and system.

SUMMARY

According to one embodiment, an acoustic resonance diagnostic method for detecting structural degradation is provided. The method includes steps as follows: Firstly, a training model is built using a deep neural network. At least two training acoustic signals are inputted to the training model to carry a training. A diagnostic model is built according to a result of the training using a convolutional neural network (CNN). A plurality of under-test sound wave signals are captured from an under-test section of an under-test structure. An artificial intelligence (AI) is used to filter data invalid for detecting structural degradation from the under-test sound wave signals. A structural degradation state of the under-test section is determined according to a remaining portion of the under-test sound wave signals through the diagnostic model.

According to another embodiment, an acoustic resonance diagnostic system for detecting structural degradation is provided. The system includes: a plurality of sound wave sensing units, a data pre-processing module, an acoustic resonance diagnostic module, and a communication module used to signal-connect the sound wave sensing unit and the acoustic resonance diagnostic module. The sound wave sensing units are used to capture a plurality of under-test sound wave signals from a plurality of under-test sections of an under-test structure. The data pre-processing module uses an AI to filter data invalid for detecting structural degradation from the under-test sound wave signals. The acoustic resonance diagnostic module is used to perform the following steps. Firstly, a training model is built using a deep neural network. Then, at least two training acoustic signals are inputted to the training model to carry a training. A diagnostic model is built according to a result of the training using a convolutional neural network. Then, at least one structural degradation state of the under-test sections is determined according to a remaining portion of the under-test sound wave signals through the diagnostic model.

As disclosed in above embodiments, the present disclosure provides an acoustic resonance diagnostic system and an acoustic resonance diagnostic method for detecting structural degradation capable of real-timely and remotely detecting the degradation state of an under-test structure (such as, pipe thinning and leakage) using a sound wave signal through contact or non-contact. The dynamic audio capturing module remotely captures the acoustic vibration generated by the under-test structure (such as, the pipe wall), senses the change in the hardness and quality of the under-test structure, and integrates the acoustic vibration to the acoustic resonance diagnostic module through the internet of things (IoT) technology and the cloud computing to build a diagnostic model using a deep learning algorithm, and further synchronically performs leakage recognition, leakage diagnosis and leakage positioning on the under-test sound wave signal to remotely monitor the degradation state.

Furthermore, the acoustic resonance diagnostic module is communication-connected to a plurality of hand-held devices or backend platforms, such that different users can real-timely get a real-time information of the under-test structure (pipe) to help the on-site leakage inspectors interpreting the state of the under-test structure (pipe) more effectively to provide a prompt inspection to assure the operation safety of the under-test structure (pipe).

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 10A is a diagram illustrating the maximum margin hyperplane, the positive hyperplane and the negative hyperplane of the SVM learning performing in the selected frequency segment with a frequency range from 600 Hz to 800 Hz and projected on a time-amplitude plane of the FIG. 2;

FIG. 10B is a diagram illustrating after the time-amplitude plane after portions of the data classified as invalid groups by the SVM are removed by the AI;

DETAILED DESCRIPTION

Figure 1:
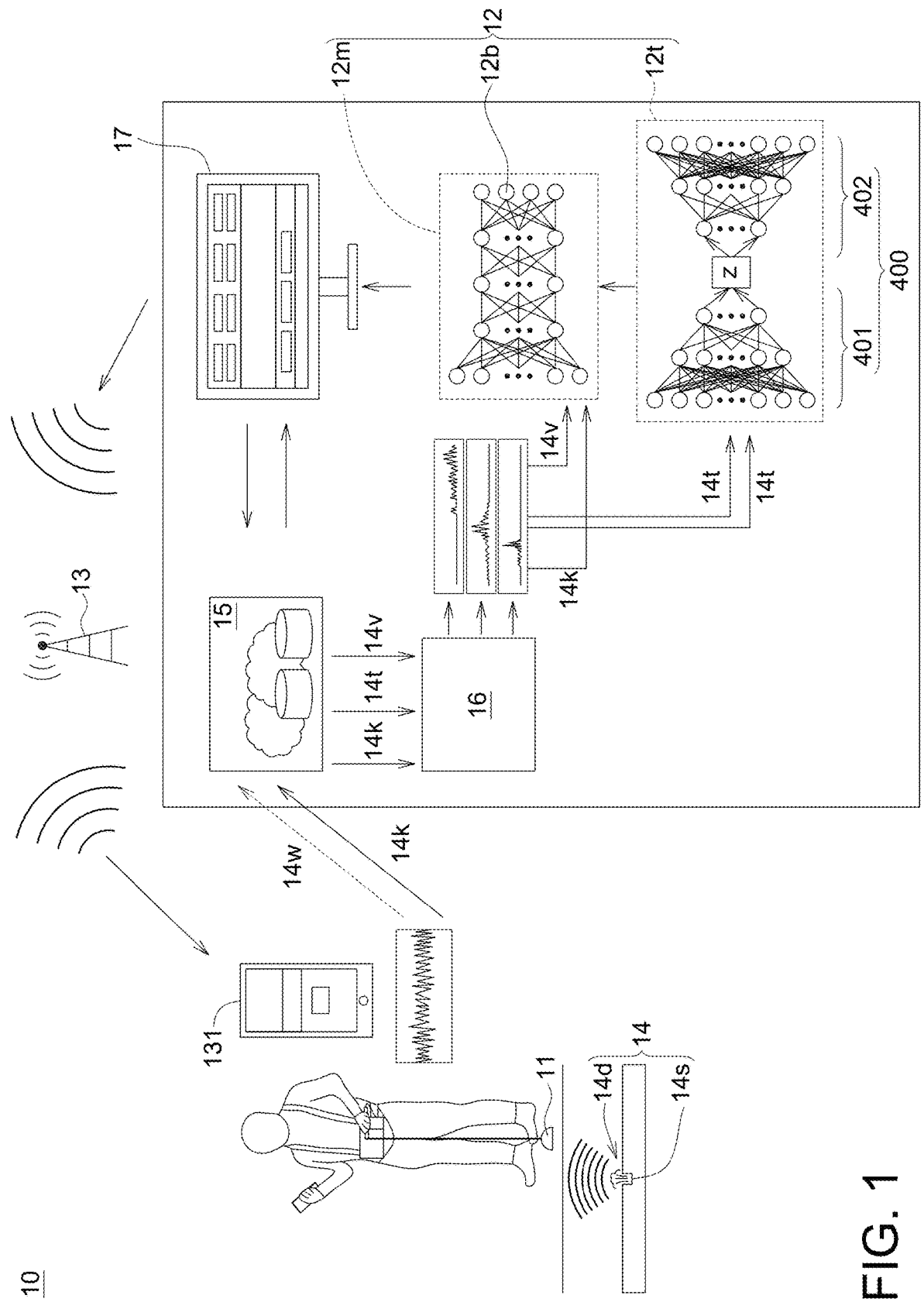
FIG. 1 is a configuration diagram of an acoustic resonance diagnostic system for detecting structural degradation according to an embodiment of the present disclosure.

The present disclosure provides an acoustic resonance diagnostic method for detecting structural degradation and a system applying the same capable of sensing structural degradation at a remote end and enabling the on-site leakage inspectors to effectively interpret the state of an under-test structure and provide a prompt inspection. For the object, technical features and advantages of the present disclosure to be more easily understood by anyone ordinary skilled in the technology field, a number of exemplary embodiments are disclosed below with detailed descriptions and accompanying drawings.

It should be noted that these embodiments are for exemplary and explanatory purposes only, not for limiting the scope of protection of the invention. The invention can be implemented by using other features, elements, methods and parameters. The preferred embodiments are merely for illustrating the technical features, not for limiting the scope of protection. Anyone skilled in the technology field of the invention will be able to make suitable modifications or changes based on the specification disclosed below without breaching the spirit of the invention. The identical elements of the embodiments are designated with the same reference numerals.

Referring to FIG. 1, a configuration diagram of an acoustic resonance diagnostic system 10 for detecting structural degradation according to an embodiment of the present disclosure is shown. The acoustic resonance diagnostic system for detecting structural degradation 10 includes a sound wave sensing unit 11, an acoustic resonance diagnostic module 12, and a communication module 13 used to signal-connect the sound wave sensing unit 11 to the acoustic resonance diagnostic module 12.

The sound wave sensing unit 11 is used to capture an under-test sound wave signal 14$k$ from an under-test section 14$s$ of an under-test structure 14. In some embodiments of the present disclosure, the under-test structure 14 can be realized by (but is not limited to) a pipe structure, such as oil pipe, water pipe or other pipe structure for transporting liquid or gas. The under-test structure 14 can be realized by a solid structure, such as floor structure, road filling structure, steel-bone structure, or other structure capable of generating an acoustic signal through acoustic resonance. In one embodiment, the sound wave sensing unit 11 can capture an under-test sound wave signal 14$k$ from the under-test section 14$s$ of the under-test structure 14 through non-contact or from a distance. In one embodiment, the sound wave sensing unit 11 can capture an under-test sound wave signal 14$k$ from the under-test section 14$s$ of the under-test structure 14 through direct contact or indirect contact.

In one embodiment of the present disclosure, the sound wave sensing unit 11 can be realized by (but is not limited to) a portable high-sensitivity piezoelectric sensor, with which the leakage inspectors can detect different positions of the under-test structure 14 (pipe structure) to capture the under-test sound wave signal 14$k$ from the under-test structure 14 (pipe structure). In the present embodiment, the under-test sound wave signal 14$k$ can be realized by (but is not limited to) a time waveform.

The sound wave sensing unit 11 does not directly contact the under-test structure 14 (pipe structure) but is separated from the under-test structure 14 (pipe structure) by a distance, that is, the sound wave sensing unit 11 does not contact the under-test structure 14. In one embodiment, the sound wave sensing unit 11 measures the under-test structure 14 through direct contact or indirect contact. In another embodiment of the present disclosure, the sound wave sensing unit 11 can be realized by (but is not limited to) several acoustic sensors directly fixed at different positions or sections of the under-test structure 14 (pipe structure). The sound wave sensing unit 11 further includes a global positioning system (GPS) for positioning the captured under-test sound wave signal 14$k$ and further transmitting the captured under-test sound wave signal 14$k$ to the acoustic resonance diagnostic module 12 or the control center through wired or wireless communication of the communication module 13 to be stored in the database 15.

The acoustic resonance diagnostic system 10 for detecting structural degradation further includes a signal filter 16 used to perform a filtering step to obtain a frequency band from each sound wave signal of the under-test structure 14 (pipe structure). In one embodiment of the present disclosure, the filtering step performed by the signal filter 16 includes: performing a time domain to frequency domain conversion to convert the time waveform of each sound wave signal into a frequency-domain waveform; capturing a part of the frequency band of the frequency-domain waveform for the acoustic resonance diagnostic module 12 to perform an acoustic resonance diagnosis. In some embodiments of the present disclosure, the frequency band used for acoustic resonance diagnosis is substantially between 10 Hz~1,800 Hz and preferably is between 30 Hz~1,600 Hz. The signal filter 16 performs a time domain to frequency domain conversion which converts the original time waveform of the sound wave signal 14w into a frequency-domain waveform. Then, the signal filter 16 captures a part of the frequency-domain waveform and makes the filtered sound wave signal 14w have a frequency band between 200 Hz~700 Hz.

In one embodiment of the present, the filtering step includes subsequently performing a discrete square wave fast Fourier transform (FFT) and a Mel frequency cepstrum (MFC) analysis on the sound wave signal captured by the sound wave sensing unit 11 by the filter 16. For example, the number of filters (signal filter 16) is 30, the Mel frequency cepstrum coefficient (MFCC) is 20 dimensions, the frequency band is between 0 Hz~44,100 Hz, the Fourier transform has 2,048 points, the size of the audio frame used in the audio file is 5 seconds (s). To avoid dramatic change between the audio frames, every two audio frames overlap by 20 milliseconds (ms). The three axes of the spectrogram 200 as depicted in FIG. 2 respectively are amplitude, frequency and time.

Figure 2:
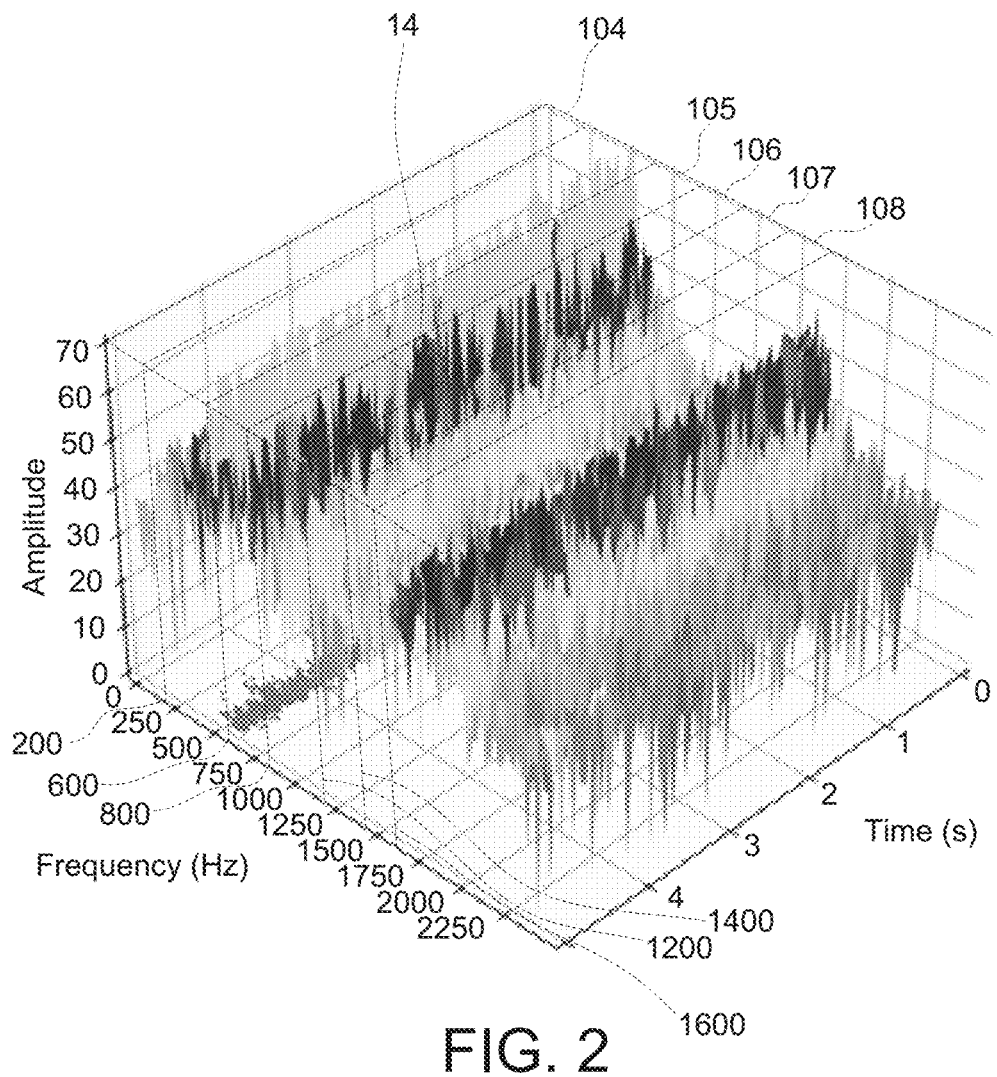
FIG. 2 is a spectrogram obtained by filtering the sound wave signal captured by a sound wave sensing unit using a filter according to an embodiment of the present disclosure.

FIG. 2 is obtained as follows. After the signal is filtered by the signal filter 16, the filtered signal can further be divided into 5 frequency bands according to the time axis (second), and each frequency band is further equally divided into 2,000 segments, and the frequencies and amplitudes of each segment are converted into two-dimensional vectors to form a 5 (time)×2,000 (frequency and amplitude) matrix (a collection of three-dimensional vectors). The above step is repeatedly performed on the signal data obtained through on-site inspection, and each time the measured sound wave signal is converted into an item of matrix data. At the end, about 430,000 items of 5×2,000 matrix data can be obtained. Then, the 430,000 items of 5×2,000 matrix data are stored in the database 15 according to the time sequence and are used as training data (serving as the training acoustic signal 14t and the verification sound wave signal 14v) to carry a training to establish the acoustic resonance diagnostic module 12.

Besides, each sound wave signal 14w must firstly be normalized before the data of the sound wave signal 14w can be trained using a deep learning algorithm. In the present embodiment, the normalization method can be such as min-max normalization. At a particular time point n, the readings obtained through 13 times of sampling form a 13×1 vector (or one-dimensional array) $x[n] \in R^{13 \times 1}$ The maximum and minimum of each reading respectively form 13×1 vectors $x_{min}[n] \in R^{13 \times 1}$ and $x_{max}[n] \in R^{13 \times 1}$. The vector x[n] is normalized according to formula (1):

$$x_{norm}[n] = \frac{x[n] - x_{min}[n]}{x_{max}[n] - x_{min}[n]}. \quad (1)$$

The normalized reading $x_{norm}[n-1]$ obtained at the previous time point is subtracted from the reading $x_{norm}[n]$ obtained at the current time point, using difference methods (DM), which can be expressed as formula (2):

$$x_{diff}[n] = |x_{norm}[n] - x_{norm}[n-1]| \in R^{13 \times 1}, \quad (2)$$

wherein, $x_{diff}$ is a difference signal.

Next, the sum of the difference signal $x_{diff}$ is calculated, and a threshold value is set, which can be expressed as formula (3):

$$\sum_{n=2}^{16} x_{diff}[n]^T [1 \quad 1 \quad \ldots \quad 1]^T > threshold \quad (3)$$

If the sum of the difference signal is greater than the threshold value, it can be determined that the inputted sound wave signal 14w is a transient signal whose waveform changes dramatically; otherwise, it can be determined that the inputted sound wave signal 14w is a steady signal whose waveform is stable and gentle. The normalized sound wave signal 14w includes a normalized training acoustic signal 14t and a verification sound wave signal 14v, which can represent a transient signal and a steady signal respectively.

Figure 3:
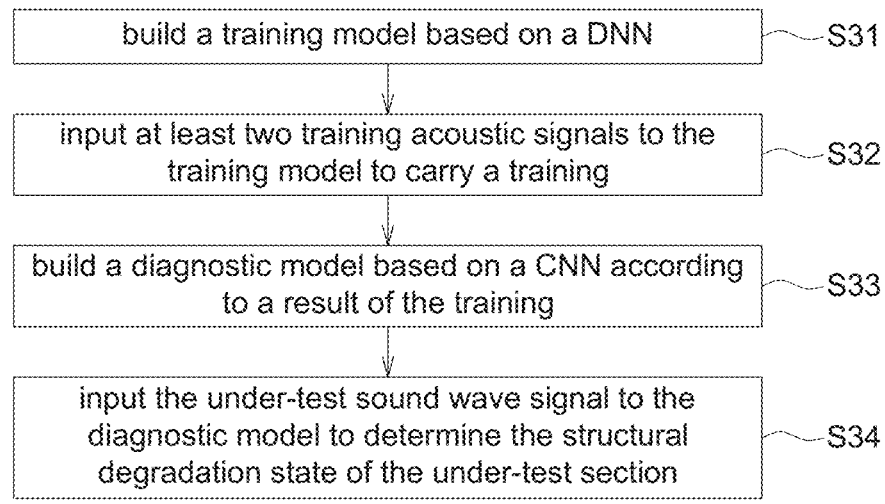
FIG. 3 is a flowchart of an acoustic resonance diagnostic method using the acoustic resonance diagnostic system as depicted in FIG. 1 to detect structural degradation according to an embodiment of the present disclosure.

The acoustic resonance diagnostic module 12 is used to perform an acoustic resonance diagnostic method for detecting structural degradation. FIG. 3 is a flowchart of an acoustic resonance diagnostic method using the acoustic resonance diagnostic system 10 as depicted in FIG. 1 to detect structural degradation according to an embodiment of the present disclosure. The acoustic resonance diagnostic method includes steps as follows: Firstly, a training model 12t based on a deep neural network (DNN) is built through unsupervised learning (step S31). Then, at least two training acoustic signals 14t (stored in the database 15) are inputted to the training model 12t to carry a training (step S32) (the normalized sound wave signal 14w includes a normalized training acoustic signal 14t and a verification sound wave signal 14v). Then, a diagnostic model 12m based on a convolutional neural network (CNN) is built according to a result of the training (step S33). Then, the under-test sound wave signal 14k is inputted to the diagnostic model 12m to determine the structural degradation state of the under-test section 14s (step S34).

Figure 4:
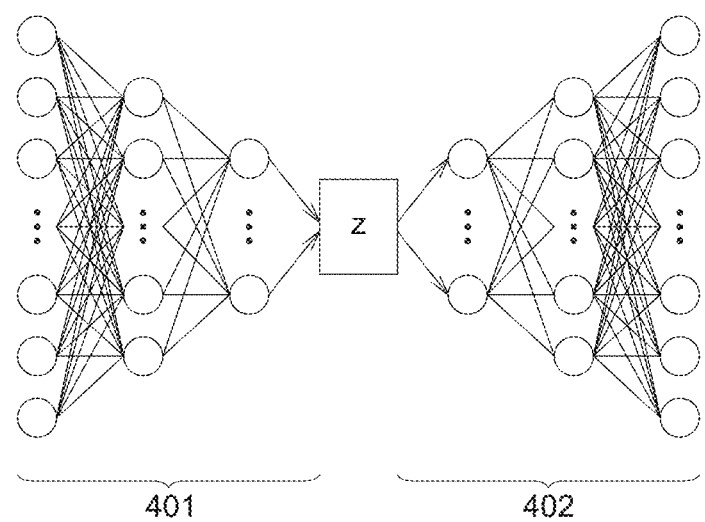
FIG. 4 is a block diagram of a deep autoencoder according to an embodiment of the present disclosure.

To put it in greater details, the training model 12t of the acoustic resonance diagnostic module 12 may include a deep autoencoder 400 based on a deep convolutional network. FIG. 4 is a block diagram illustrating the deep autoencoder 400 according to an embodiment of the present disclosure. The structure of the deep autoencoder 400 can be divided into an encoder 401 and a decoder 402, which are respectively used to compress and decompress the training acoustic signal 14t. In the present embodiment, the deep autoencoder 400 is built based on multiple full-connection layers, the encoder 401 has the maximum number of Input neurons on the inputting layer, and the number of neurons on the hidden layers of the encoder 401 diminishes layer by layer. Features of the original training acoustic signal 14t can be extracted through linear transformation or highly nonlinear transformation or the dimensionality reduction of the data.

The decoder 402 decompresses the output code of the encoder 401 to restore the inputted data. In other words, the input data and the output data of the deep autoencoder 400 would be the same. In the present embodiment, since the full-connection layers only accept the input of one-dimensional array, thus the sound wave signal 14w with a 5×2,000 input matrix, prior to being inputted to the deep autoencoder 400, should be flattened as 10,000 one-dimensional arrays. For example, the number of neurons on each layer of the encoder 401 diminishes from 10,000 to 5,000 and 2,500. The encoder 401 has three continuous full-connection layers. The decoder 402 has three continuous full-connection layers, respectively having 2,500, 5,000 and 10,000 neurons. At last, 10,000 values are outputted.

The training of the acoustic resonance diagnostic module 12 includes the following steps: Firstly, 80% of the sound wave signal 14w stored in the database 15 (for example, the data of the sound wave signal 14w that are classified as transient data 14t and obtained according to formulas (2) and (3)) are selected and inputted into the deep autoencoder 400 of the training model 12t for extracting feature values through the encoder 401, whereby a plurality of representative features Z can be extracted from the original training acoustic signal 14t and several feature labels 12b are preselected. Through adjustment, it can be verified that the transient data having been treated with a compression process and a decompression process of the deep autoencoder 400 still possess excellent restoration performances. In the present embodiment, through the feature-extraction performed by the deep autoencoder 400, the training acoustic signal 14t basically can be classified into four feature labels 12b, namely, leakage frequency, metal frequency, ambient frequency (environmental frequency) and noise frequency.

Afterwards, a diagnostic model 12m including a convolutional autoencoder is built according to the feature labels 12b of the training model 12t using a convolutional neural network. The remaining 20% of the sound wave signal 14w (for example, the remaining data of the sound wave signal 14w that are classified as steady data 14v and obtained according to formulas (2) and (3)) are inputted to the convolutional autoencoder of the diagnostic model 12m and used as verification data (also called as the verification sound wave signal 14v) to test whether the diagnostic model 12m can successfully detect the transient state. The criterion for determining the transient state is whether the error between the signal restored by the convolutional autoencoder of the diagnostic model 12m and the original signal is over a predetermined threshold value (the signal to noise ratio: 500). If so, the inputted training data are determined as transient data. In the present embodiment, the algorithms used by the convolutional autoencoder include the k-means clustering algorithm.

The output result of the diagnostic model 12m is compared with the verification data, and the weights and the number of feature labels 12b of the diagnostic model 12m are adjusted to complete the training of the acoustic resonance diagnostic module 12. After the training is completed, the sum of the feature values of the feature labels 12b of the diagnostic model 12m is equivalent to 1. In the present embodiment, the 4 feature labels respectively are: leakage frequency, metal frequency, ambient frequency and noise frequency.

After the training of the acoustic resonance diagnostic module 12 is completed, the under-test sound wave signal 14k is inputted to the diagnostic model 12m of the acoustic resonance diagnostic module 12, and the pipe structure and the current structure state of the under-test section 14s of the under-test structure 14 (pipe structure) from which the under-test sound wave signal 14k is captured can be determined according to the feature value outputted by each of the feature labels 12b of the diagnostic model 12m.

In some embodiments of the present disclosure, when the diagnostic model 12m determines that the under-test section 14s of the under-test structure 14 (pipe structures) from which the under-test sound wave signal 14k is captured leaks, the acoustic resonance diagnostic module 12 can further compare the frequency band of the under-test sound wave signal 14k with the historical data of several sound wave signals with identical pipe structures but different leakage features in terms of acoustic frequency offset and amplitude variation, wherein the historical data are stored in the database 15. Thus, relative position of the structural degradation feature 14d in the under-test section 14s of the under-test structure 14 (pipe structure) can be recognized, and the degeneration of the structural degradation feature 14d can be estimated.

The communication module 13 can be realized by a wired or wireless communication device used to signal-connect the sound wave sensing unit 11 to the acoustic resonance diagnostic module 12 for transmitting the sound wave signal captured by the sound wave sensing unit 11 to the acoustic resonance diagnostic module 12 for determination. The communication module 13 may be, for example, a base station of 4G/5G.

In some embodiments of the present disclosure, the communication module 13 may further include a plurality of hand-held devices 131, respectively held by the on-site leakage inspectors or the experts at a remote end. The communication module 13 can transmit the sound wave signal (for example, the training acoustic signal 14t and/or the under-test sound wave signal 14k) captured by the sound wave sensing unit 11 and/or the result determined by the acoustic resonance diagnostic module 12 (for example, the probability of outputting the label 12b) to the on-site leakage inspectors or the experts at the remote end for their reference. Since different users can real-timely get the current state of the under-test structure, the performance of on-site inspection can be effectively improved and the operation safety of the under-test structure 14 (pipe structure) can be assured.

Meanwhile, through the hand-held device 131 of the communication module 13, the on-site leakage inspectors and the experts at the remote end can provide correction advice or instruction to the acoustic resonance diagnostic module 12 to correct or update the diagnostic model 12m of the acoustic resonance diagnostic module 12 according to their individual authority.

In some embodiments of the present disclosure, the acoustic resonance diagnostic system for detecting structural degradation 10 further includes a human-machine interface 17 for integrating the operation procedures of the sound wave sensing unit 11, the acoustic resonance diagnostic module 12 and the communication module 13 as an integrated monitoring management clouds platform. In the present embodiment, the communication module 13 can transmit the diagnosis result obtained by the acoustic resonance diagnostic module 12, the sound wave signal (for example, the frequency tracing graph and the spectrogram) captured by the sound wave sensing unit 11, the inspection position of the sound wave sensing unit 11 and the marking of leakage point on the map to be directly displayed on the user's computer in the form of graphs through a graphical user interface (GUI).

In some embodiments of the present disclosure, when the under-test section 14s is determined to be in a leakage state, the historical data of several sound wave signals with identical pipe structure but different structural degradation (leakage) features 14d can be compared to generate a frequency tracing graph, a spectrogram, and a category diagnostic result, and the position of the structural degradation (leakage) feature 14d in the under-test section 14s can be marked. The historical data are stored in the database 15.

Figure 5:
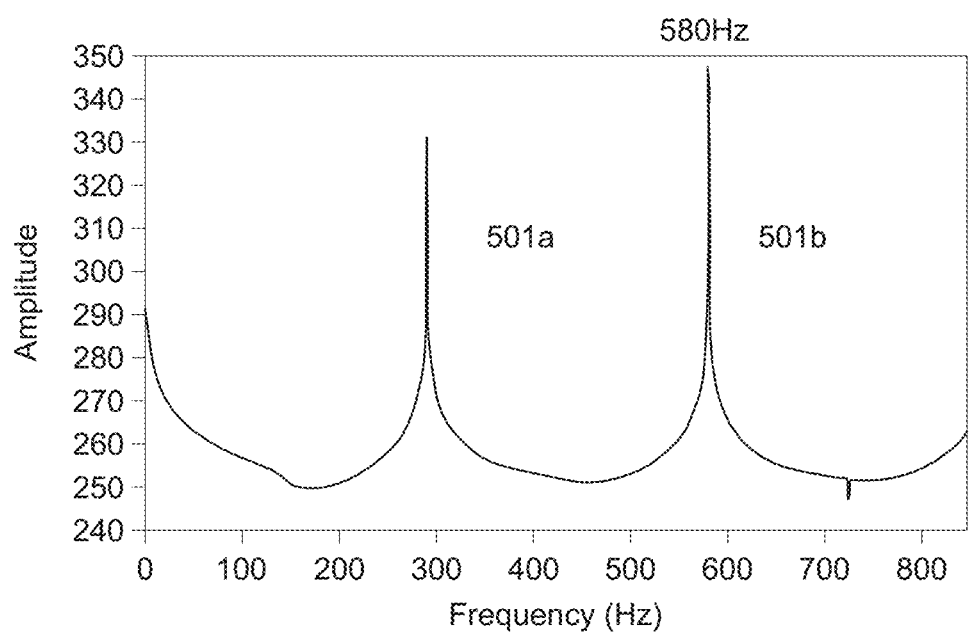
FIG. 5 is a schematic diagram of a frequency band of an under-test sound wave signal in a leakage state according to an embodiment of the present disclosure.

When the under-test section 14s is determined to be in a leakage state, the frequency band of the under-test sound wave signal 14k having been processed with the time domain to frequency domain conversion will have at least one characteristic frequency (peak). Referring to FIG. 5, a schematic diagram of frequency band of an under-test sound wave signal 14k in a leakage state according to an embodiment of the present disclosure is shown. In the present embodiment, the under-test section 14s is determined as a metal tube in a leakage state according to the label value outputted from the feature label 12b of the diagnostic model 12m, and the frequency band of the under-test sound wave signal 14k respectively generates characteristic frequencies 501a and 501b at frequencies 290 Hz and 580 Hz.

Figure 6:
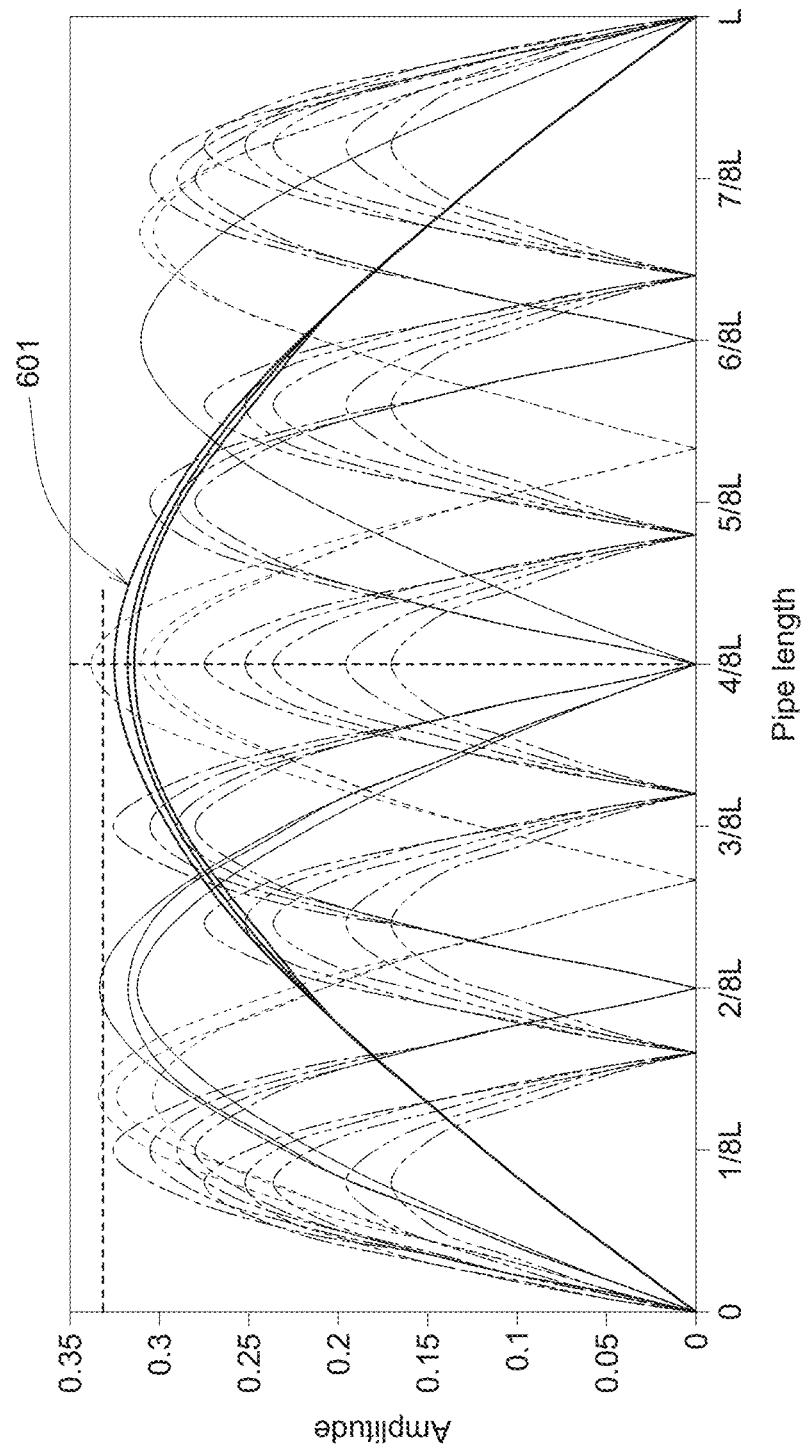
FIG. 6 is a graph of several amplitude vs position (length) curves of the under-test sections with identical structural degradation (leakage) feature but different feature positions, that are stored in a database, according to an embodiment of the present disclosure.

Then, the characteristic amplitude values of the characteristic frequencies 501a and 501b and their characteristic frequencies are compared with a plurality of amplitude vs position (length) curves of the under-test sections 14s with identical structural degradation (leakage) feature 14d but different feature positions obtained from different under-test sections 14s, that are stored in a database 15, to determine the position of the structural degradation (leakage) feature 14d in the under-test section 14s. FIG. 6 is a graph of several amplitude (dB) vs position (length) curves of the under-test sections 14s with identical structural degradation (leakage) feature 14d but different feature positions, that are stored in the database 15, according to an embodiment of the present disclosure.

In the present embodiment, an amplitude (mdB) vs position (length, meter) curve 601 can be obtained from the database 15 according to the characteristic frequencies 501a and 501b. The amplitude vs position (length) curve 601 represents an amplitude vs position (length) curve corresponding to the frequency of 580 Hz. Then, since the crest position of the curve 601 converted according to the characteristic amplitude value 340 dB of the characteristic frequency 501b is close to the crest position at ⅘ L of the pipe length, relative position of the structural degradation (leakage) feature 14d can be marked as ⅘ L of the pipe length of the under-test section 14s.

Figure 7:
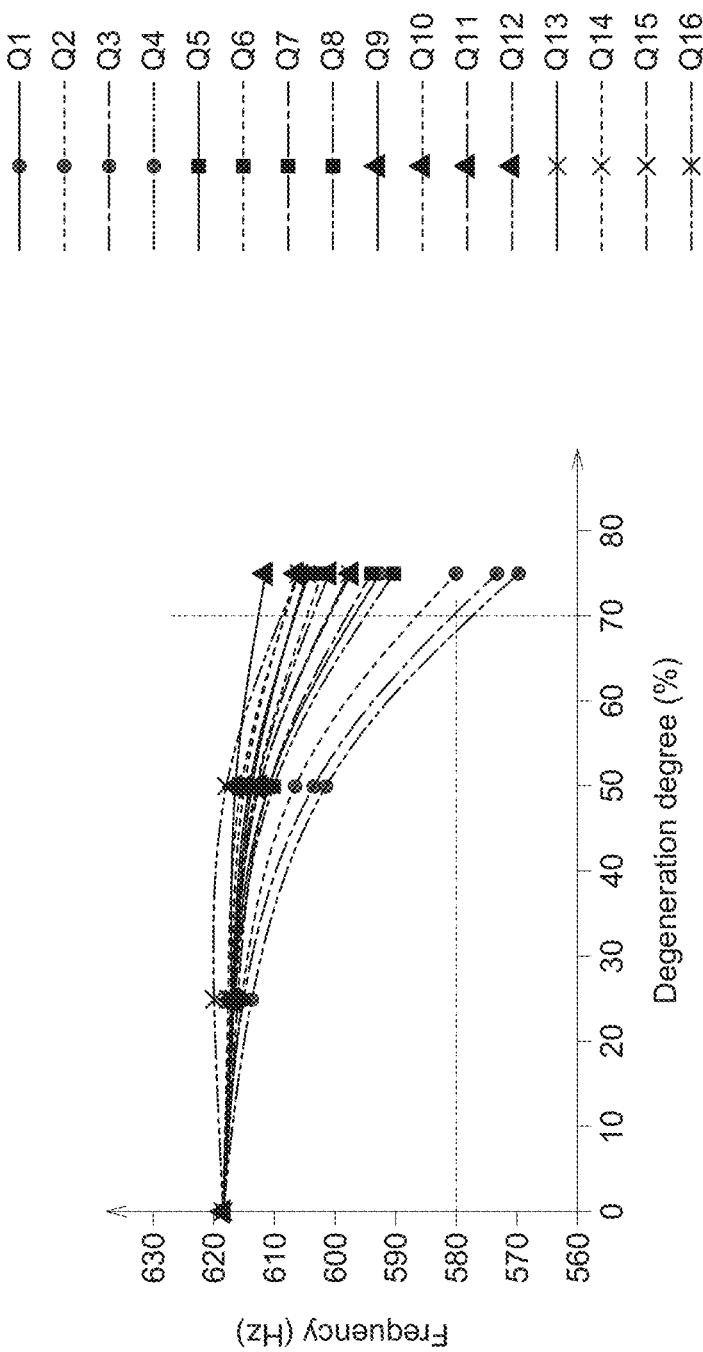
FIG. 7 is a graph of several amplitude vs position (length) curves corresponding to specific characteristic frequencies in a database according to an embodiment of the present disclosure.

According to the characteristic amplitude values of the characteristic frequencies 501a and 501b, a plurality of amplitude vs degeneration curves 601 corresponding to specific characteristic frequencies in a database 15 can be compared to estimate the degeneration degree of the structural degradation (leakage) feature 14d. Referring to FIG. 7, a graph of several amplitude vs position (length) curves corresponding to specific characteristic frequencies, that are stored in the database 15, according to an embodiment of the present disclosure is shown. The curves Q1 to Q16 respectively represent the amplitude vs degeneration relationship of different defect sizes. For example, for the intersection between the horizontal dotted line and the vertical dotted lines of FIG. 7, it can be estimated according to the sum of the characteristic frequency 302 (580 Hz) that the current structural degradation (leakage) feature 14d of the under-test section 14s has a degeneration degree of about 70%.

Then, through the human-machine interface 17 of the acoustic resonance diagnostic system 10 for detecting structural degradation, the acoustic resonance diagnostic result can be directly displayed on the user's computer in the form of a graph and stored in a monitoring management clouds platform. Also, through the communication module 13, the on-site leakage inspectors or the experts at the remote end can real-timely grasp the current state of the under-test structure and share the inspection information and historical records.

Figure 8:
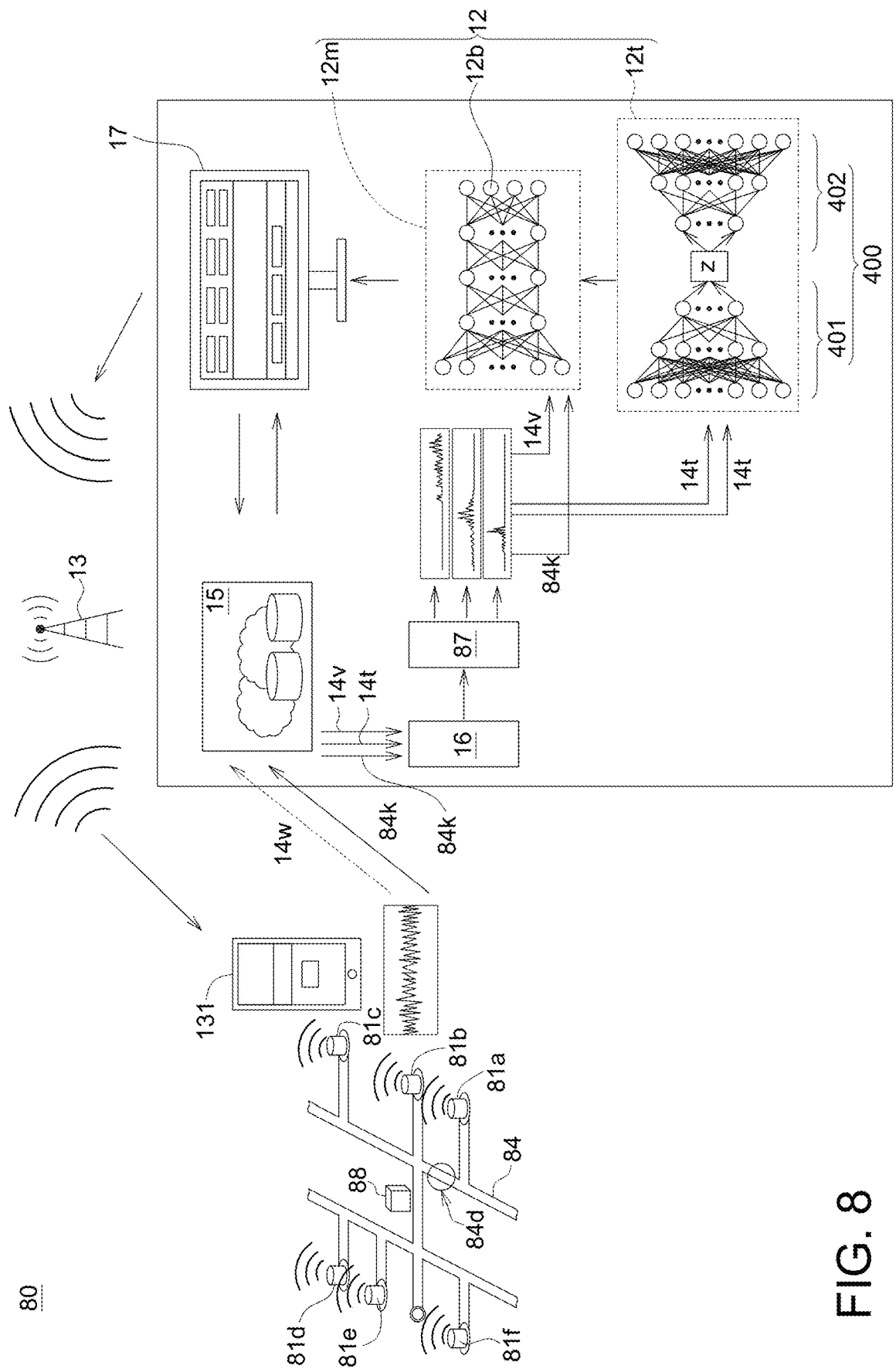
FIG. 8 is a configuration diagram illustrating an acoustic resonance diagnostic system for detecting structural degradation according to another embodiment of the present disclosure.

FIG. 8 is a configuration diagram illustrating an acoustic resonance diagnostic system 80 for detecting structural degradation according to another embodiment of the present disclosure. The acoustic resonance diagnostic system 80 is similar to the acoustic resonance diagnostic system 10 as depicted in FIG. 1 except that the acoustic resonance diagnostic system 80 further includes a plurality of sound wave sensing units 81a-81f fixed adjacent to the under-test structure 84 (pipe structure) and at least one vibration generator 88.

In some embodiments, the sound wave sensing units 81a-81f may directly contact the under-test structure 84 (pipe structure). For example, the sound wave sensing units 81 may be respectively fixed on a flood meter, a valve and/or a pipeline branch of the under-test structure 84 (pipe structure). Alternatively, the sound wave sensing units 81a-81f may not directly contact the under-test structure 84 (pipe structure) but is separated from the under-test structure 84 (pipe structure) by a distance. For example, the under-test structure 84 (pipe structure) is buried underground, and the sound wave sensing units 81 may be disposed on the ground above the under-test structure 84 (pipe structure).

In the present embodiment, each of the sound wave sensing units 81 is fixed on one of the flood meters that is disposed in a user terminal of a pipe system, and each two adjacent ones of the sound wave sensing units 81a-81 are separated from each other for a distance (such as, 10 m). In an embodiment, the sound wave sensing units 81a-81 could be disposed on fire hydrants so as to sense leakage signals within the fire water pipes. However, the arrangement of the sound wave sensing units 81 and the distance between adjacent two of them are not limited. Any device that is fixed locally and can be used to capture under-test sound wave signals 84k generated around the under-test structure 84 may not breach the spirit of the invention.

Each of the sound wave sensing units 81a-81f has a communication device (not shown) communicating with the communication module 13 and used to signal-connect the corresponding sound wave sensing unit 81 to the acoustic resonance diagnostic module 12 through the communication module 13. In some embodiments of the present disclosure, the communication module 13 can transmit the sound wave signal 84k captured by the sound wave sensing units 81 to the acoustic resonance diagnostic module 12 and/or the experts (through the human-machine interface 17) at the remote end for their reference.

The acoustic resonance diagnostic system 80 further includes a data pre-processing module 87 using artificial intelligence (AI) to filter the data invalid for detecting structural degradation from the under-test sound wave signals 84k, so as to reduce the computing load and improve the performance (such as, the diagnostic accuracy) of the acoustic resonance diagnostic module 12.

For example, in the present embodiments, the data pre-processing module 87 applies a machine learning, such as support vector machine (SVM) learning to remove or substitute the data invalid for detecting structural degradation from the under-test sound wave signals 84k from the three-dimensional vectors (the 5 (time)×2,000 (and amplitude) matrix as shown in FIG. 2) processed by the signal filter 16.

In detail, when the acoustic resonance diagnostic module 12 receives the under-test sound wave signal 84k, the signal filter 16 performs a time domain to frequency domain conversion (such as, a discrete square wave fast Fourier transform (FFT) and/or a Mel frequency cepstrum (MFC) analysis) to convert the original time waveform of the under-test sound wave signal 84k into a three axes (amplitude, frequency and time) spectrogram 200 as depicted in FIG. 2, which is regarded as 2D/3D feature planes. That is, the signal filter 16 transforms and splits the under-test sound wave signal 84*k*. Then, the data preprocessing module 87 removes the environment noises.

The frequency-domain waveform of the under-test sound wave signal 84*k* processes by the signal filter 16 (see FIG. 2) is then compared with the historical frequency-domain waveforms with various leakage features that are previously collected, well trained, provided by the historical data stored in the database 15, wherein the historical data of several sound wave signals varies with identical pipe structures but different leakage features in terms of acoustic frequency offset and amplitude variation, so as to select a plurality of frequency segment of the frequency-domain waveform of the under-test sound wave signal 84*k*. The historical data includes historical frequency-domain waveforms.

In some embodiments of the present disclosure, the training model 12*t* may classify the historical frequency-domain waveforms with various leakage features into several groups each of which has a characteristic curve representing different prototypes of structural degradation. An 2D graphic comparison process is then performed by an AI tool comparing the frequency-domain waveform of the under-test sound wave signal 84*k* with the that of the historical frequency-domain waveforms to select a plurality of frequency segments, wherein the characteristic curves of the selected frequency segments match portions of the characteristic curves in the historical frequency-domain waveforms.

Figure 9:
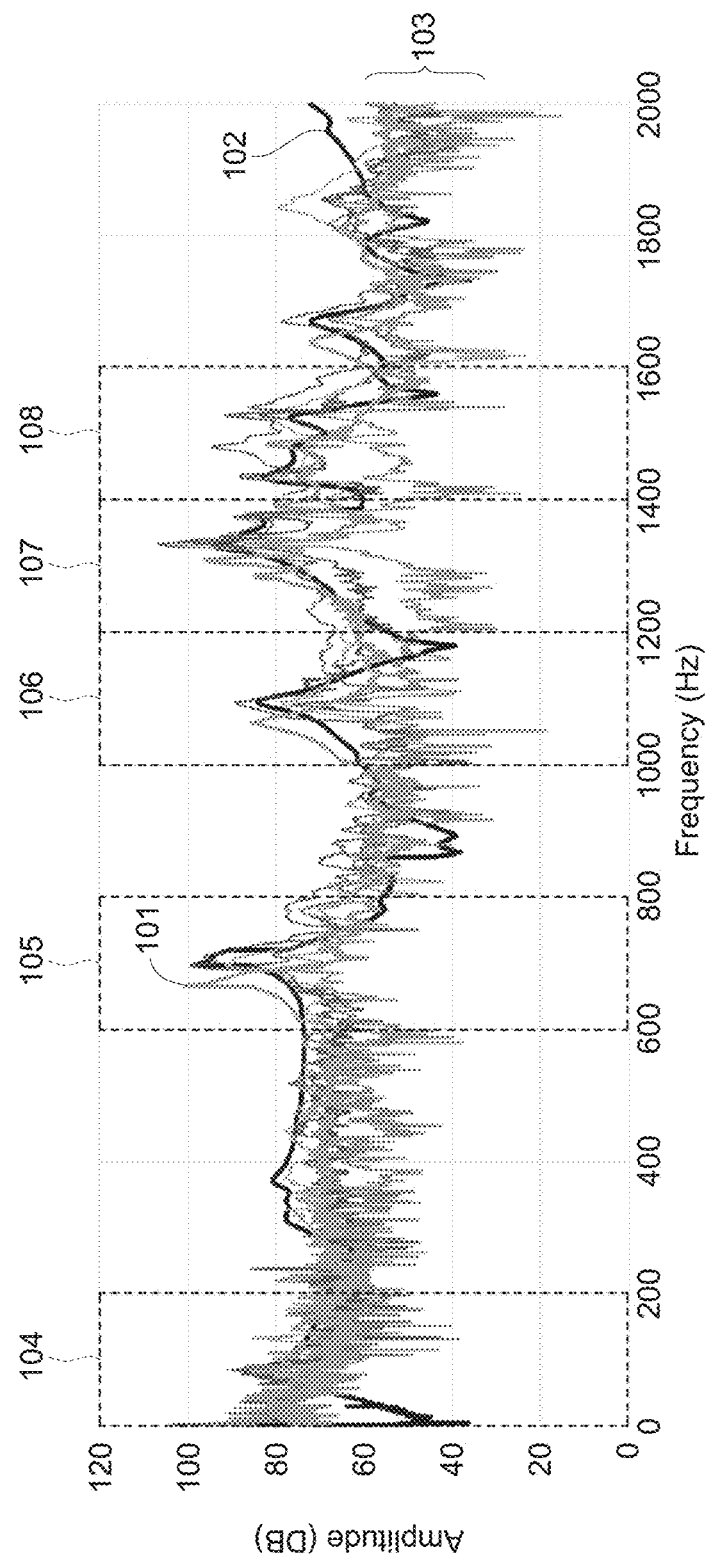
FIG. 9 is a diagram illustrating the characteristic curves of the historical frequency-domain waveforms with different prototypes of structural degradation provided by the historical data stored in the database and the frequency-domain waveform of the under-test sound wave signal.

FIG. 9 is a diagram illustrating the characteristic curves 102 and 103 of the historical frequency-domain waveforms with different prototypes of structural degradation (such as, the leakage of 10 mm diameter and the leakage of 25 mm in a metal tube) provided by the historical data stored in the database 15 and the frequency-domain waveform 103 of the under-test sound wave signal 84*k*. Wherein, there are five frequency segments 104-108 in which the frequency-domain waveform 103 of the under-test sound wave signal 84*k* match the characteristic curves 102 and 103 of the historical frequency-domain waveforms. The data valid for detecting structural degradation from the under-test sound wave signals 84*k* corresponding to the five frequency segments 104-108 can be thus selected form the three-dimensional vectors, as shown in FIG. 2.

Subsequently, a SVM learning, using learning algorithms including classification and regression analysis is performed to classify the data involved in the five frequency segments 104-108 of the frequency-domain waveform 103 into a plurality groups, and the group having extreme values or peaks may be removed from the selected data corresponding to the five frequency segments 104-108 according to a predetermine threshold value.

For example, FIG. 10A is a diagram illustrating the maximum margin hyperplane 11, the positive hyperplane 12 and the negative hyperplane 13 of the SVM algorithm performing in the selected frequency segment 105 (with the frequency range from 600 Hz to 800 Hz) and projected on a time-amplitude plane of the FIG. 2. In the present embodiment, the maximum margin hyperplane 11 of the SVM algorithms is represented by the equation, $y=0$ (wherein y is the amplitude); the positive hyperplane 12 of the SVM algorithms is represented by the equation, $y=1500$; and the negative hyperplane 13 of the SVM algorithm of the SVM algorithms is represented by the equation, $y=-1500$.

As shown in FIG. 10A, portions of the data in the selected frequency segment 105 having amplitude greater than 1500 dB or less than $-1500$ dB may be classified as invalid groups 14 (such as, the environmental frequency groups including a metal frequency group, an ambient frequency and a noise frequency group) by the SVM algorithm and then removed from the selected data valid for detecting structural degradation corresponding to the frequency segment 105 (see FIG. 2 and FIG. 10B). The other selected data invalid for detecting structural degradation can be also removed from the selected data corresponding to the other frequency segments 104 and 106-108 respectively by the same way.

It should be appreciated that, the number of the data remained in each one of the selected frequency segments 104-108 must greater than a threshold. In the present embodiment, any one of the selected frequency segments 104-108 that has remaining data less than 60%, the remained data of the corresponding frequency segment also should be voided. Alternatively, in some other embodiments, the removed data can be substituted by the data copied from the valid data in the same frequency segment. Such that the number of the data in an individual frequency segment would not be reduced after the SVM learning.

The remaining data in the selected frequency segments 104-108 in FIG. 9 are then reunion to form a fitting-three-dimensional vectors (not shown), and then transmitted to the diagnostic model 12*m* to determine the structural degradation state of the under-test structure 84 (pipe structure). The structural degradation states are referred to as pipe thinning and/or leakage.

In the present embodiment, the diagnostic model 12*m* may compare the characteristic curves of the leaking pipes provided by the historical data stored in the database 15 with that of the fitting-three-dimensional vectors to determine the structural degradation state of the under-test structure 84 (pipe structure) and to identify the frequency bands (the frequency range 104-108 enclosed by the dotted frame) associated with the feature labels 12*b*. When the under-test structure 84 (pipe structure) is determined to be in a leakage state, the position of the structural degradation (leakage) feature 84*d* (the distance of the structural degradation (leakage) feature 84*d* separated from the working sound wave sensing units 81*a*) can be established by the method as described in FIGS. 5 and 6.

By removing the classified data groups that are resulted by the environment noises from the under-test sound wave signals 84*k* collected by the sound wave sensing units 81*a*-81*c*, the data more related to the sound wave signals generated by the under-test structure 84 (pipe structure) can be inputted into the acoustic resonance diagnostic module 12 for determining the structural degradation state and the leakage position, while the computing load of the acoustic resonance diagnostic module 12 can be significant reduced. Therefore, the performance (such as, the diagnostic accuracy) of the acoustic resonance diagnostic module 12 can be improved.

However, when too few valid data are remained by the data pre-processing module 87 and/or when the amplitude values of the under-test sound wave signals 84*k* collected by the sound wave sensing units 81*a*-81*c* is too low, the performance (e.g., the diagnostic accuracy) of the acoustic resonance diagnostic module 12 may be deteriorated. Thus, an active acoustic resonance diagnostic method triggered by the vibration generator 88 is provided to improve the performance (e.g., the diagnostic accuracy) of the acoustic resonance diagnostic module 12.

In the present embodiment, the vibration generator 88 is fixed on or disposed adjacent to the under-test structure 84 (pipe structure) for providing at least one sound vibration on the under-test structure 84 (pipe structure) with an amplitude value greater than that of the sound wave signal previously collected by the sound wave sensing units 81*a*-81*c*. The sound wave signals (such as, the sound of leakage) resulted by the under-test structure 84 (pipe structure) and the eigenvectors thereof can be reinforced. The reinforced sound wave signals and the eigenvectors thereof can be then inputted into the diagnostic model 12*m* to perform the diagnostic process as mentioned above to determine the structural degradation state of the under-test structure 84 (pipe structure). Therefore, the performance (e.g., the diagnostic accuracy) of the acoustic resonance diagnostic module 12 can be improved correspondingly.

Figure 11A:
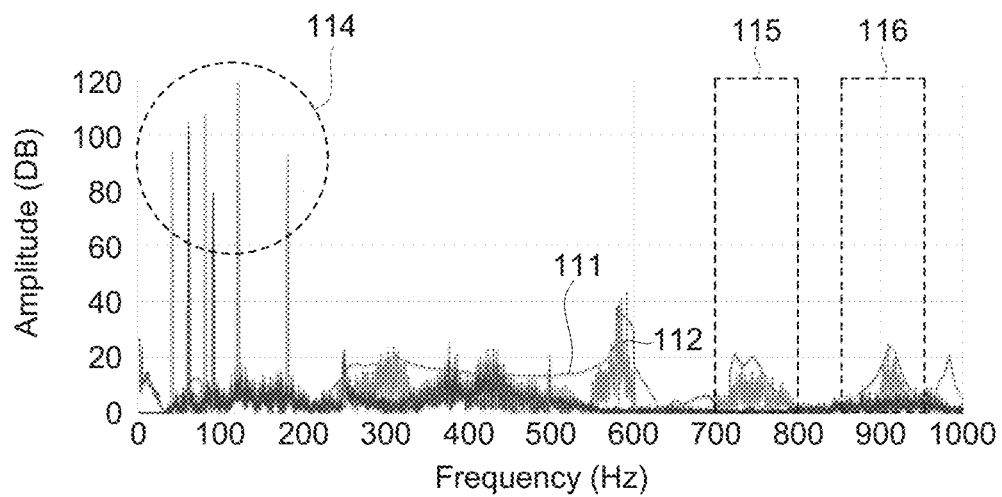
FIG. 11A and FIG. 11B are diagrams illustrating the frequency-amplitude curves respectively representing the eigenvectors of the fitting-three-dimensional vectors with or without reinforced by the vibration triggered by the generator.
Figure 11B:
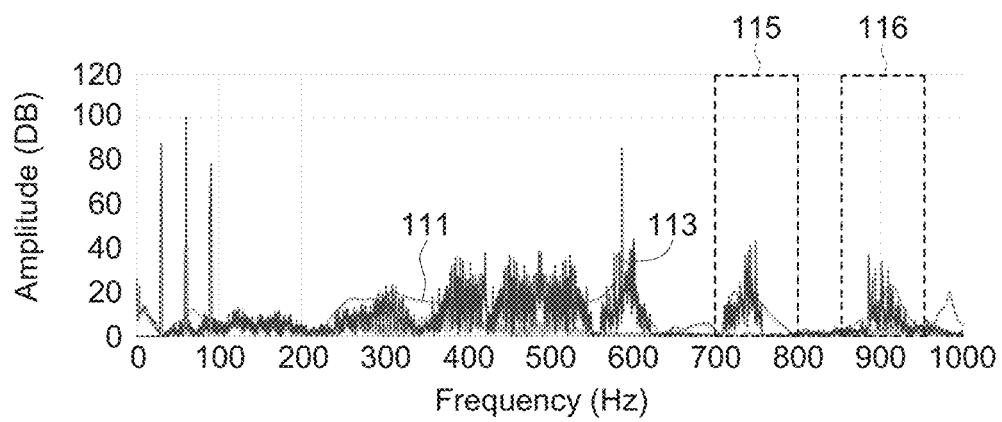

For example, FIG. 11A is a diagram illustrating the characteristic curves (frequency-amplitude curves) 111 and 112 of the leaking pipe provided by the historical data stored in the database 15 and that of the fitting-three-dimensional vectors without reinforced by the sound vibration triggered by the vibration generator 88 during the acoustic resonance diagnostic process. FIG. 11B are diagrams illustrating the characteristic curves (frequency-amplitude curves 111 and 113) of the leaking pipe provided by the historical data stored in the database 15 and that of the fitting-three-dimensional vectors with reinforced by the sound vibration triggered by the generator 88 during the acoustic resonance diagnostic process.

It can be indicated that the amplitude values within the selected frequency sections (the frequency range enclosed by the dotted frame) 115 and 116 associated with the feature labels 12*b* for determining the structural degradation state can be significantly reinforced by the sound vibration triggered by the vibration generator 88.

In some embodiment, the sound vibration triggered by the vibration generator 88 may have a frequency 114 (the frequency range enclosed by the dotted circle) to form a standing wave in the under-test structure 84 (pipe structure). The frequency 114 of the standing wave can be estimated using the following equation:

$$f_n = \frac{2nV}{L}$$

wherein $f_n$ is the frequency of the standing wave; L is the distance between the working sound wave sensing units 81*a* and the vibration generator 88; V is speed of sound; and n is the mode number of the standing wave.

Subsequently, when the under-test structure 84 (pipe structure) is determined to be in a leakage state, an amplitude (mdB) vs position (length, meter) curve (such as the position curve 601 depicted in FIG. 6) can be obtained from the database 15 according to the frequency 114 of the standing wave; and the leakage position can be identified by referring the amplitude of the characteristic frequencies that occurs in the frequency band associated with the leakage (as depicted in FIG. 5) to the position (length) in FIG. 6. Thereby, a position of the structural degradation (leakage) feature 84*d* related of the distance L between the working sound wave sensing units 81*a* and the vibration generator 88 can be marked.

Alternatively, in some embodiments of the present disclosure, the relative position of the structural degradation (leakage) feature 84*d* can be marked by referring to the relationship between sound pressure change rate and the unit wavelength of the standing wave.

Figure 12A:
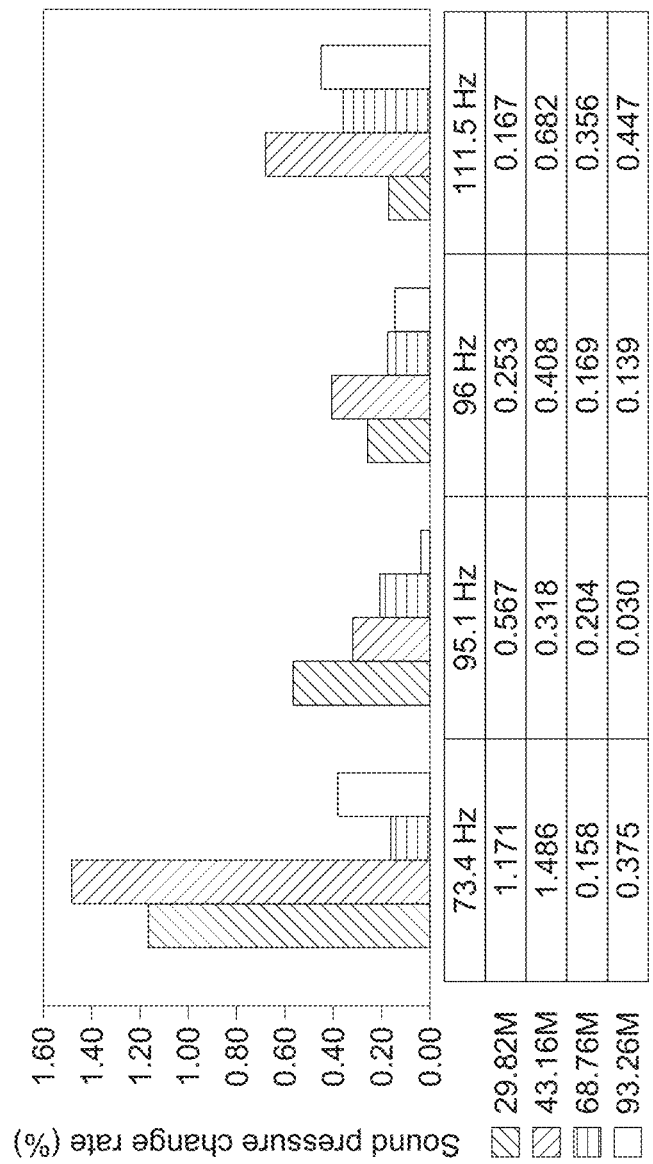
FIG. 12A is a bar chart illustrating 4 sound pressure change rate of the sound vibrations with different frequencies and the relative positions of the leakage features that cause the sound pressure change.
Figure 12B:
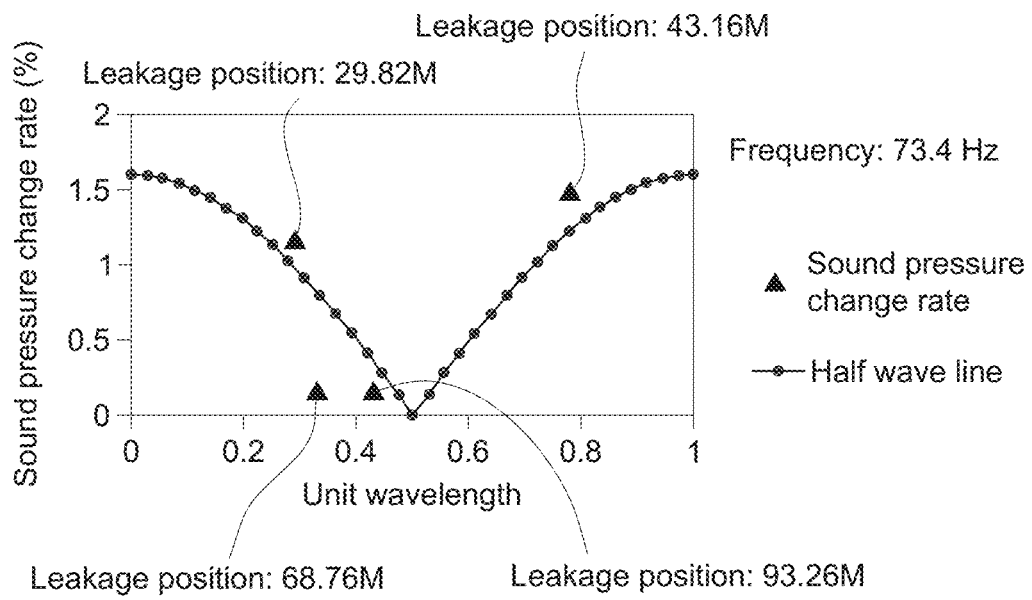
FIG. 12B to FIG. 12E are diagrams illustrating the relationship between sound pressure change rate and unit wavelength of the standing wave with different frequencies respectively.
Figure 12C:
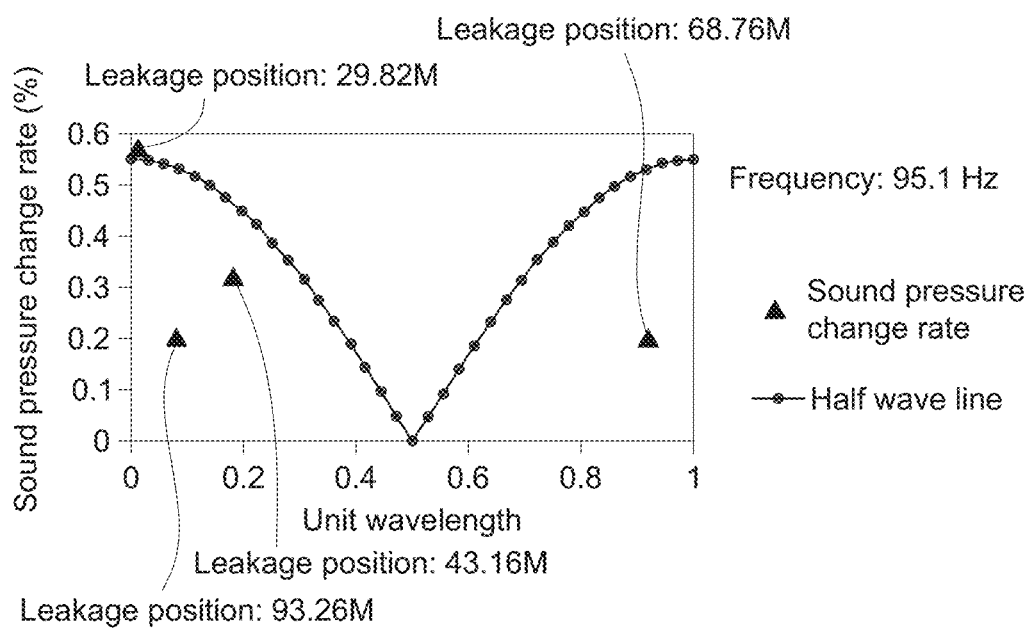
Figure 12D:
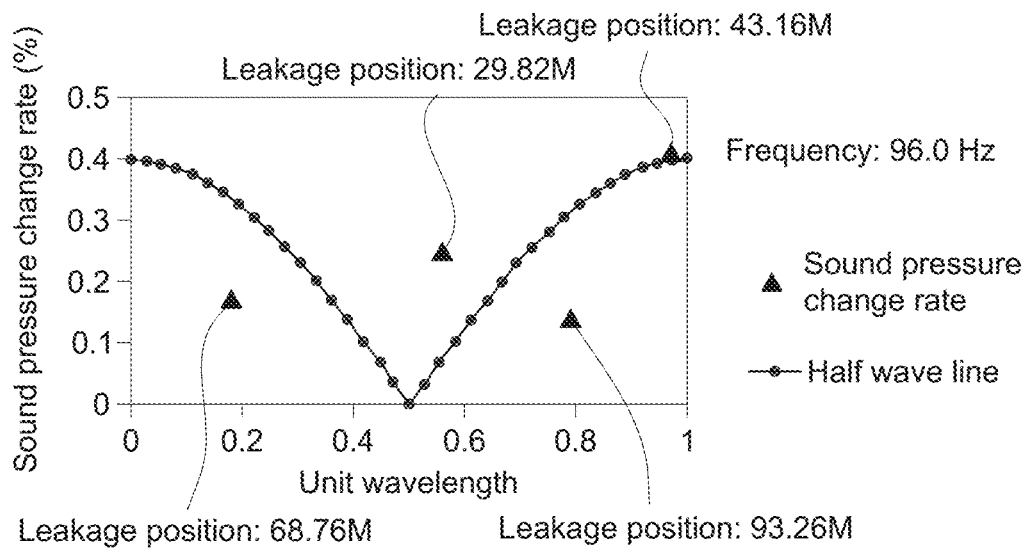
Figure 12E:
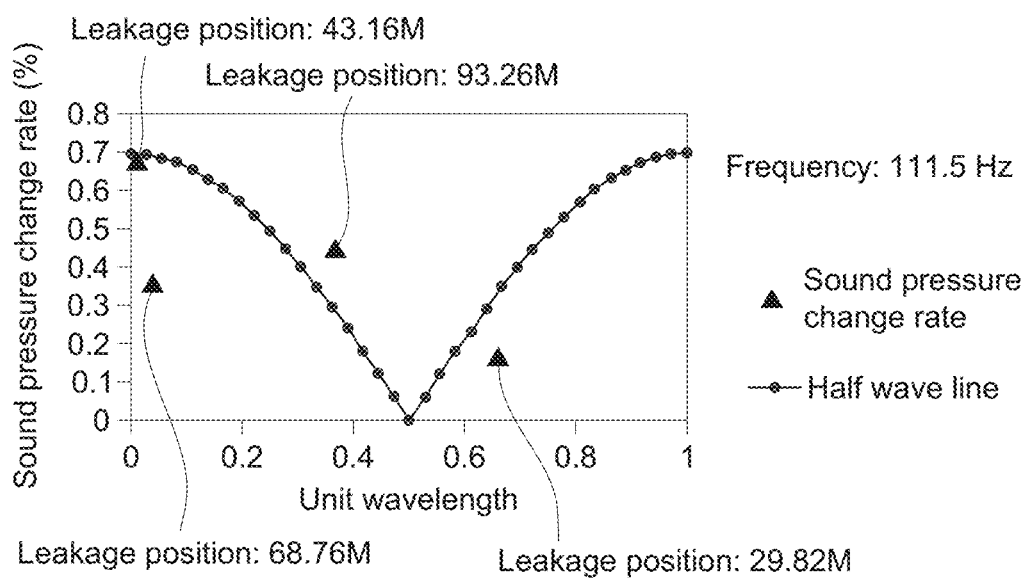

For example, FIG. 12A is a bar chart illustrating 4 sound pressure change rate of the sound vibrations with different frequencies (73.4 Hz, 95.1 Hz, 96 HZ and 111.5 HZ) and the relative positions of the leakage features (i.e. the distance of 29.82 m, 43.16 m, 68.76 m and 93.26 m that are measured from the vibration generator 88 to the leakage features) that cause the sound pressure change. FIG. 12B to FIG. 12E are diagrams illustrating the relationship between sound pressure change rates and unit wavelengths of the standing waves with different frequencies (73.4 Hz, 95.1 Hz, 96 HZ and 111.5 HZ) respectively.

According to FIG. 12A to FIG. 12E, it can be proved that the distance (29.82 m, 43.16 m, 68.76 m and 93.26 m) can be estimated by referring to the relationship between sound pressure change rate and unit wavelength of the standing wave; and the distance measured from the vibration generator 88 to the leakage feature can be estimated a N×λ; wherein λ is the unit wavelength of the standing wave; and N is a real number greater than 1.

In some embodiments of the present disclosure, the active acoustic resonance diagnostic method is initiated and controlled by the human-machine interface 17. For example, in the present embodiment, when the number of the three-dimensional vectors filtered by the signal filter 16 are removed by the data pre-processing module 87 greater than 60% or the amplitude values of the under-test sound wave signals 84*k* collected by the working sound wave sensing units 81*a* is lower than 20 dB, the vibration generator 88 adjacent to the working sound wave sensing units 81*a* can be activated to provide the vibration according to the instruction that is filed by the human-machine interface 17 and transmitted through the through wired or wireless communication of the communication module 13.

It should appreciate that, the number of the vibration generator 88 and the position on which the vibration generator 88 is disposed may not be limited, and any device, component that can trigger a vibration on the under-test structure 84 (pipe structure) according to the instruction of the human-machine interface 17 may not breaching the spirit of the invention.

As disclosed in above embodiments, the present disclosure provides an acoustic resonance diagnostic system and an acoustic resonance diagnostic method for detecting structural degradation capable of real-timely remotely detecting the degradation state of an under-test structure (such as pipe thinning and leakage) using a sound wave signal through contact or non-contact. The dynamic audio capturing module remotely captures the acoustic vibration generated by the under-test structure (such as the pipe wall), senses the change in the stiffness and quality of the under-test structure, and integrates the acoustic vibration to the acoustic resonance diagnostic module through the IoT technology and the cloud computing to build a diagnostic model using a deep learning algorithm, and further synchronically performs leakage recognition, leakage diagnosis and leakage positioning on the under-test sound wave signal to remotely monitor the degradation state.

Furthermore, the acoustic resonance diagnostic module is communication-connected to a plurality of hand-held devices or backend platforms, such that different users can real-timely get a real-time information of the under-test structure (pipe) to help the on-site leakage inspectors interpreting the state of the under-test structure (pipe) more effectively and provide a prompt inspection. Meanwhile, engineers can remotely sense the current state of the structure (pipe) and correctly detect the leakage without visiting the site in person and checking the audio with a stethoscope. Thus, human errors or misjudgments can be reduced, and the operation safety of the under-test structure (pipe) can be assured.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An acoustic resonance diagnostic method for detecting structural degradation of an under-test section of an under-test structure, the method comprising:
  building a database and storing reference acoustic signals in the database as training acoustic signals which are derived from mathematic calculations and/or based on historic acoustic data of structures similar to the under-test section;
  classifying the training acoustic signals into transient training acoustic signals and steady training acoustic signals according to states of the reference acoustic signals;
  capturing a plurality of under-test sound wave signals as captured under-test acoustic signals from the under-test section and storing the captured under-test acoustic signals also in the database;
  using an artificial intelligence (AI) to filter out acoustic signals in the database that are invalid for detecting structural degradation of the under-test section;
  building a training model using a deep neural network (DNN);
  inputting at least two filtered transient training acoustic signals as training acoustic signals to the training model to carry out a training of the training model;
  building a diagnostic model according to a result of the training using a convolutional neural network (CNN);
  inputting a remaining portion of the filtered training acoustic signals, being the filtered steady training acoustic signals, as verifying acoustic signals to the diagnostic model, to verify that the diagnostic model has been trained thus can successfully detect transient acoustic signals, the diagnostic model then outputs detection signals and labels the detection signals as leakage frequency, metal frequency, ambient frequency, or noise frequency;
  inputting the captured and filtered under-test acoustic signals to the trained diagnostic model;
  determining a structural degradation state of the under-test section by comparing the inputted captured and filtered under-test acoustic signals to the labeled detection signals in the trained diagnostic model.

2. The acoustic resonance diagnostic method for detecting structural degradation according to claim 1, wherein the step of using the artificial intelligence (AI) to filter out the acoustic signals in the database that are invalid for detecting structural degradation of the under-test section comprises:
  performing an 2D graphic comparison process to compare a frequency-domain waveform of the captured under-test signals with characteristic curves of historical frequency-domain waveforms with different prototypes of structural degradation provided by historical data so as to select a plurality of frequency segments from the captured under-test acoustic signals, wherein characteristic curves of the selected frequency segments match portions of the characteristic curves in the historical frequency-domain waveforms;
  applying a support vector machine (SVM) learning using a classification and/or a regression analysis to remove portions of the captured under-test acoustic signals from the selected frequency segments according to a predetermine threshold value;
  reunion remaining portions of the selected frequency segments.

3. The acoustic resonance diagnostic method for detecting structural degradation according to claim 1, further comprising providing at least one sound vibration on the under-test structure.

4. The acoustic resonance diagnostic method for detecting structural degradation according to claim 3, wherein the at least one sound vibration has an amplitude value greater than that of the plurality of under-test sound wave signals previously captured.

5. The acoustic resonance diagnostic method for detecting structural degradation according to claim 3, wherein the at least one sound vibration has a frequency to form a standing wave in the under-test structure.

6. The acoustic resonance diagnostic method for detecting structural degradation according to claim 5, wherein the frequency of the standing wave is estimated using the following equation:

$$f_n = \frac{2nV}{L};$$

wherein $f_n$ is the frequency of the standing wave; L is a distance between a sensing unit used to capture the plurality of under-test sound wave signals and a vibration generator for providing the at least one sound vibration; V is speed of sound; and n is a mode number of the standing wave.

7. The acoustic resonance diagnostic method for detecting structural degradation according to claim 5, further comprising identifying a leakage position by referring to a relationship between a sound pressure change rate of the at least one sound vibration and an unit wavelength of the standing wave.

8. An acoustic resonance diagnostic system for detecting structural degradation of a plurality of under-test sections of an under-test structure, the system comprising:
  a database to store reference acoustic signals as training acoustic signals which are derived from mathematic calculations and/or based on historic acoustic data of structures similar to the under-test sections, the training acoustic signals are classified into transient training acoustic signals and steady training acoustic signals according to states of the reference acoustic signals;
  a plurality of sound wave sensing units, to capture a plurality of under-test sound waves as captured under-test acoustic signals from the under-test sections, the captured under-test acoustic signals are then stored also in the database;
  a communication module to signal-connect the sound wave sensing units to the database;
  a data pre-processing module, using an AI to filter out the acoustic signals in the database that are invalid for detecting structural degradation of the under-test sections;
  an acoustic resonance diagnostic module to perform the following steps:
    building a training model using a deep neural network;
    inputting at least two filtered transient training acoustic signals as training acoustic signals to the training model to carry out a training of the training model;
    building a diagnostic model according to a result of the training using a neural network;

inputting a remaining portion of the filtered training acoustic signals, being the filtered steady training acoustic signals, as verifying acoustic signals to the diagnostic model, to verify that the diagnostic model has been trained thus can successfully detect transient acoustic signals, the diagnostic model then outputs detection signals and labels the detection signals as leakage frequency, metal frequency, ambient frequency, or noise frequency;

inputting the captured and filtered under-test acoustic signals to the trained diagnostic model; and determining at least one structural degradation state of the under-test sections by comparing the inputted captured and filtered under-test acoustic signals to the labeled detection signals in the diagnostic model.

9. The acoustic resonance diagnostic system for detecting structural degradation according to claim 8, wherein the plurality of sound wave sensing units are fixed on and/or adjacent to the under-test section.

10. The acoustic resonance diagnostic system for detecting structural degradation according to claim 8, wherein the step of using the AI to filter out the acoustic signals in the database that are invalid for detecting structural degradation of the under-test sections comprises:

performing an 2D graphic comparison process to compare a frequency-domain waveform of the captured under-test acoustic signals with characteristic curves of historical frequency-domain waveforms with different prototypes of structural degradation provided by historical data to select a plurality of frequency segments from the captured under-test acoustic signals, wherein characteristic curves of the selected frequency segments match portions of the characteristic curves in the historical frequency-domain waveforms;

applying a support vector machine (SVM) learning using a classification and/or a regression analysis to remove portions of the captured under-test acoustic signals from the selected frequency segments according to a predetermine threshold value;

reunion remaining portions of the selected frequency segments.

11. The acoustic resonance diagnostic system for detecting structural degradation according to claim 8, further comprising a vibration generator used to provide at least one sound vibration on the under-test structure.

12. The acoustic resonance diagnostic system for detecting structural degradation according to claim 11, wherein the at least one sound vibration has an amplitude value greater than that of the plurality of under-test sound wave signals previously captured.

13. The acoustic resonance diagnostic system for detecting structural degradation according to claim 11, wherein the at least one sound vibration has a frequency to form a standing wave in the under-test structure.

14. The acoustic resonance diagnostic system for detecting structural degradation according to claim 13, wherein the frequency of the standing wave is estimated using the following equation:

$$f_n = \frac{2nV}{L};$$

wherein $f_n$ is the frequency of the standing wave; L is a distance between a sensing unit used to capture the plurality of under-test sound wave signals and a vibration generator for providing the at least one sound vibration; V is speed of sound; and n is a mode number of the standing wave.

15. The acoustic resonance diagnostic system for detecting structural degradation according to claim 13, further comprising a human-machine interface for identifying a leakage position by referring to a relationship between a sound pressure change rate of the at least one sound vibration and an unit wavelength of the standing wave.

* * * * *